United States Patent

Negre et al.

[11] Patent Number: 6,098,268
[45] Date of Patent: Aug. 8, 2000

[54] ASSEMBLY WORKSHOP, IN PARTICULAR FOR ASSEMBLING TOGETHER SHEET METAL PARTS

[75] Inventors: Bernard Negre, Paris; Gérard Pinchon, Acheres, both of France

[73] Assignee: ABB Preciflex Systems, Beauchamp, France

[21] Appl. No.: 08/860,021

[22] PCT Filed: Dec. 22, 1995

[86] PCT No.: PCT/FR95/01727

§ 371 Date: Jun. 20, 1997

§ 102(e) Date: Jun. 20, 1997

[87] PCT Pub. No.: WO96/20809

PCT Pub. Date: Jul. 11, 1996

[30] Foreign Application Priority Data

Dec. 29, 1994 [FR] France .................................. 94 15860

[51] Int. Cl.[7] .................................................. B23P 21/00
[52] U.S. Cl. ........................... 29/563; 29/564.1; 29/33 K; 29/33 P; 29/794; 198/346.2
[58] Field of Search ........................ 219/388; 228/4.1 A, 228/49.8; 29/563, 564, 564.1, 33 K, 33 P, 711, 786, 783, 784, 791, 793, 794; 198/346.1, 346.2

[56] References Cited

U.S. PATENT DOCUMENTS

| | | | |
|---|---|---|---|
| 4,172,512 | 10/1979 | Clegg et al. | 198/346.1 |
| 4,658,947 | 4/1987 | Welder | 198/346.2 |
| 4,703,558 | 11/1987 | Makinen | 29/784 |
| 4,738,387 | 4/1988 | Jaufmann et al. | |
| 4,759,489 | 7/1988 | Pigott | 228/49.8 |
| 4,767,046 | 8/1988 | Kumagai et al. | 29/33 P |
| 4,815,190 | 3/1989 | Haba, Jr. et al. | 198/346.1 |
| 4,893,402 | 1/1990 | Hirasaka et al. | 29/784 |
| 4,999,578 | 3/1991 | Ohashi et al. | 198/346.2 |
| 5,098,005 | 3/1992 | Jack | 29/784 |
| 5,143,270 | 9/1992 | Hamada et al. | 228/4.1 A |
| 5,156,254 | 10/1992 | Kitamura et al. | 198/346.1 |
| 5,184,766 | 2/1993 | Takahashi et al. | 228/49.8 |

FOREIGN PATENT DOCUMENTS

| | | |
|---|---|---|
| 0229244 | 7/1987 | European Pat. Off. . |
| 0438989 | 7/1991 | European Pat. Off. . |
| 2270290 | 3/1994 | United Kingdom . |

OTHER PUBLICATIONS

Machinery and Production Engineering vol. 124, No. 3190, 16 janvier 1974 Burgesshill GB, pp. 54–59 XPOO2OOO651 J.J. Marklew : "Fiat examine fresh techniques for producing motor cars" voir p. 55 colonne de gauche ligne 35 p. 56 colonne de gauche ligne 16.

IBM Technical Disclosure Bulletin vol. 27, No. 12, mai 1985 Armonk NY USA, pp. 6876–6877 XP002000652 "Adaptable automatic circuit board transportation system".

*Primary Examiner*—Daniel W. Howell
*Attorney, Agent, or Firm*—Griffin, Butler, Whisenhunt & Szipl, LLP

[57] ABSTRACT

An assembly workshop for assembling together sheet metal parts, the workshop including preparation stations for putting parts in place relative to one another, assembly stations for fixing the prepared parts together, and finishing stations serving to finish off fixing the parts together. More precisely, said workshop is constituted by a plurality of modules (2, 3, 22, 23), interconnected by at least one general conveyor means (1, 21) extending in a determined direction (A), each module including a loading and unloading central station (4, 24) through which the general conveyor means (1) passes, a preparation lateral station (7, 27) connected to the central station (4, 24) by a conveyor (8, 28) substantially perpendicular to the conveyor means (1, 21), an assembly station (13) connected to the central station (4, 24) by a conveyor (14, 34) substantially perpendicular to the general conveyor means (1, 21), and at least one finishing station (16, 36) situated along the general conveyor means (1, 21), downstream from the central station (4, 24).

6 Claims, 6 Drawing Sheets

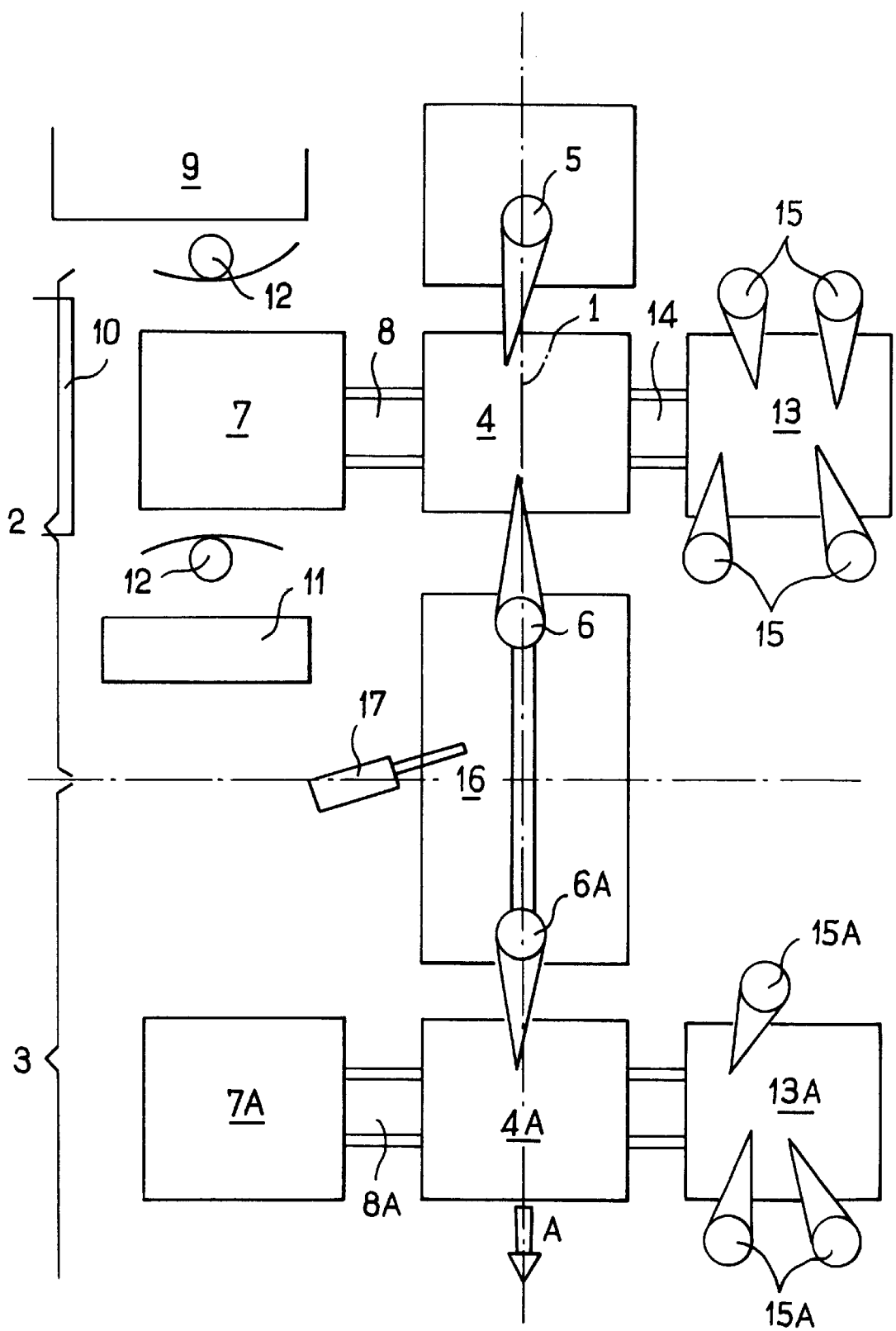
FIG_1

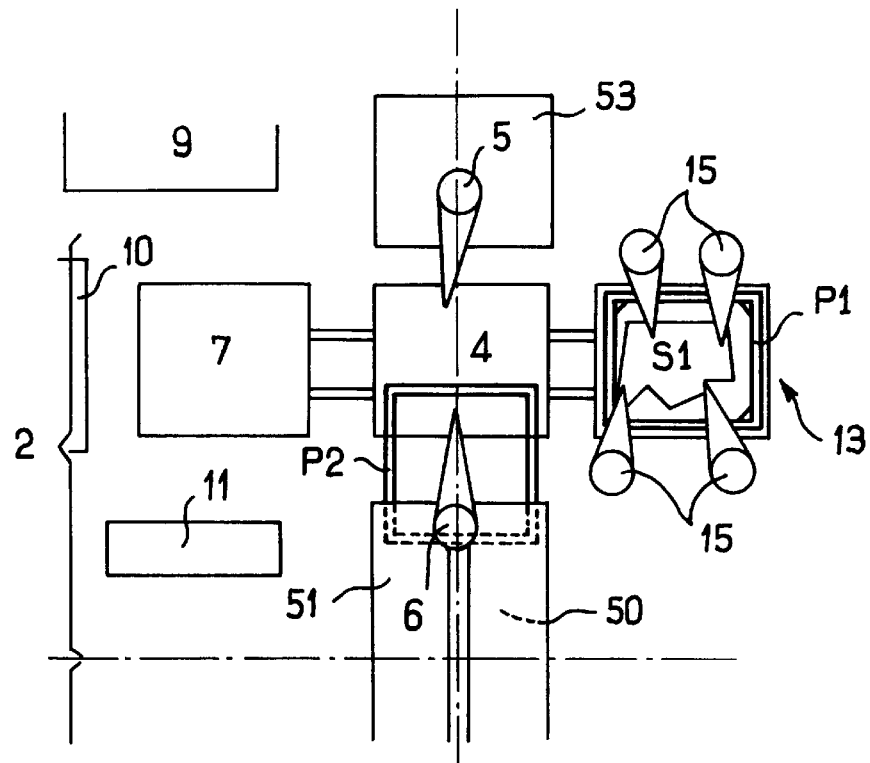
FIG._2
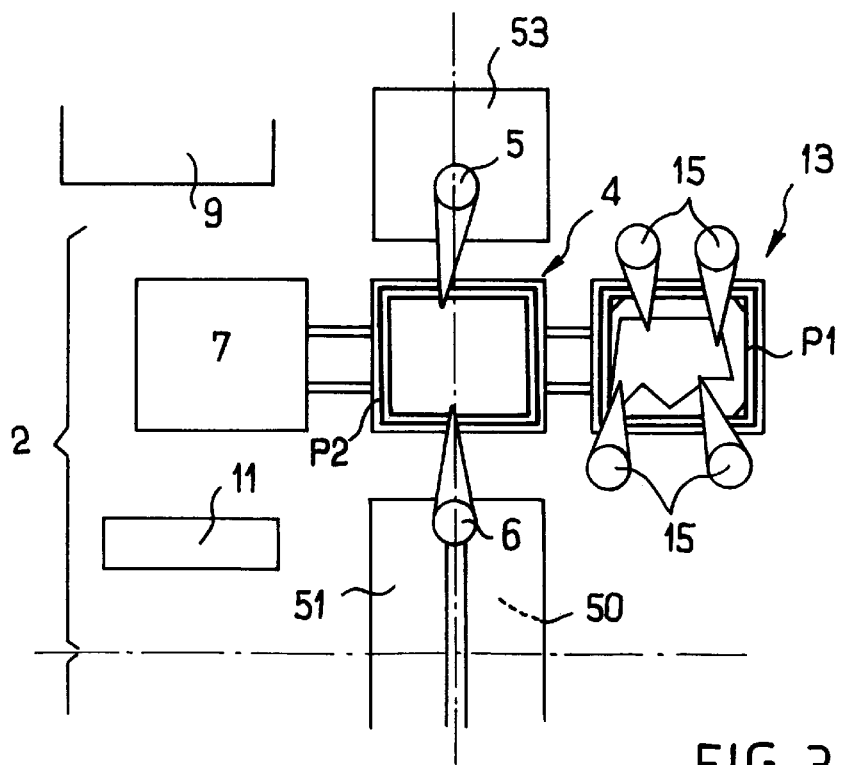
FIG._3

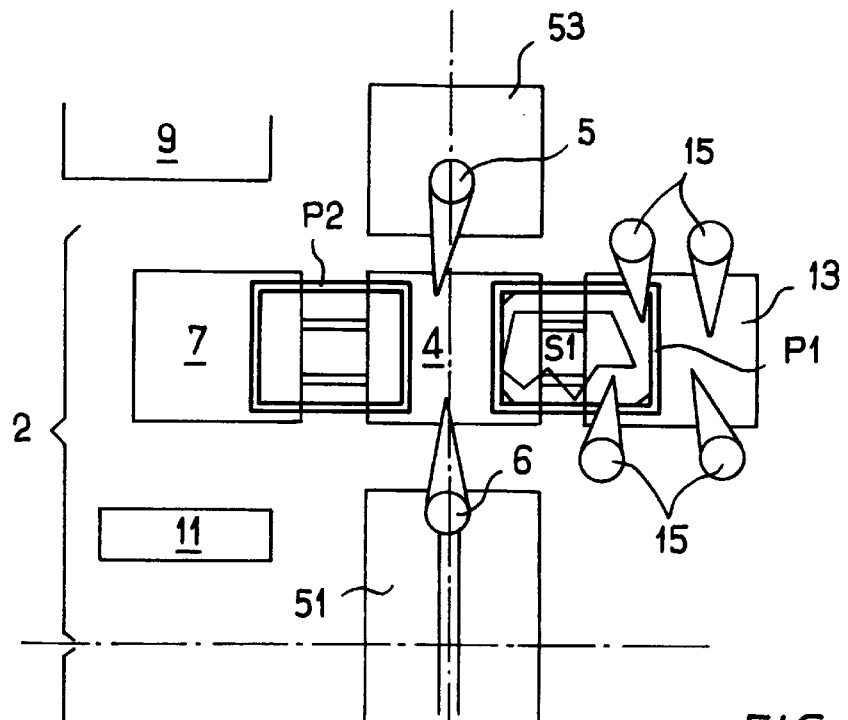
FIG_4
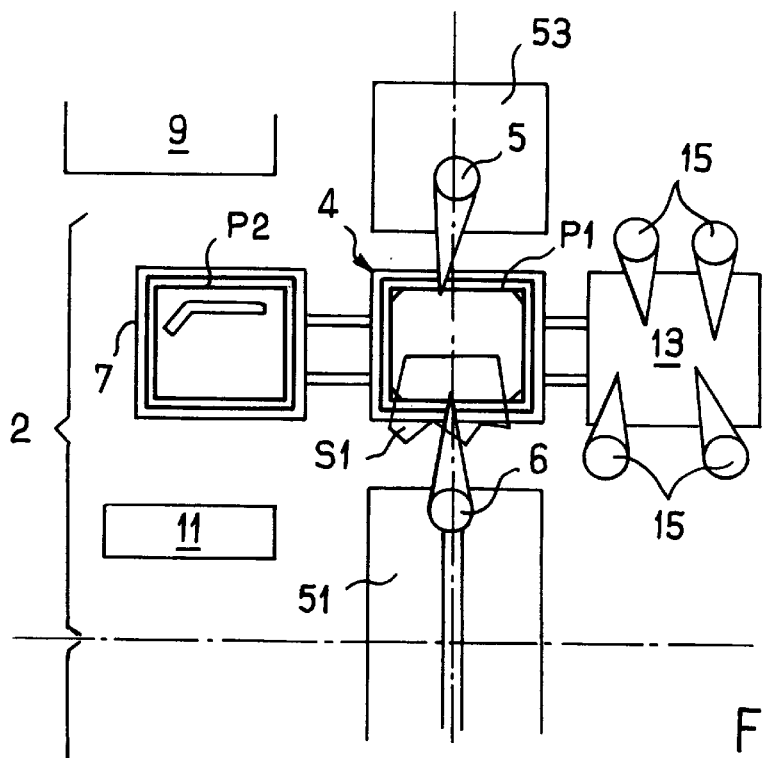
FIG_5

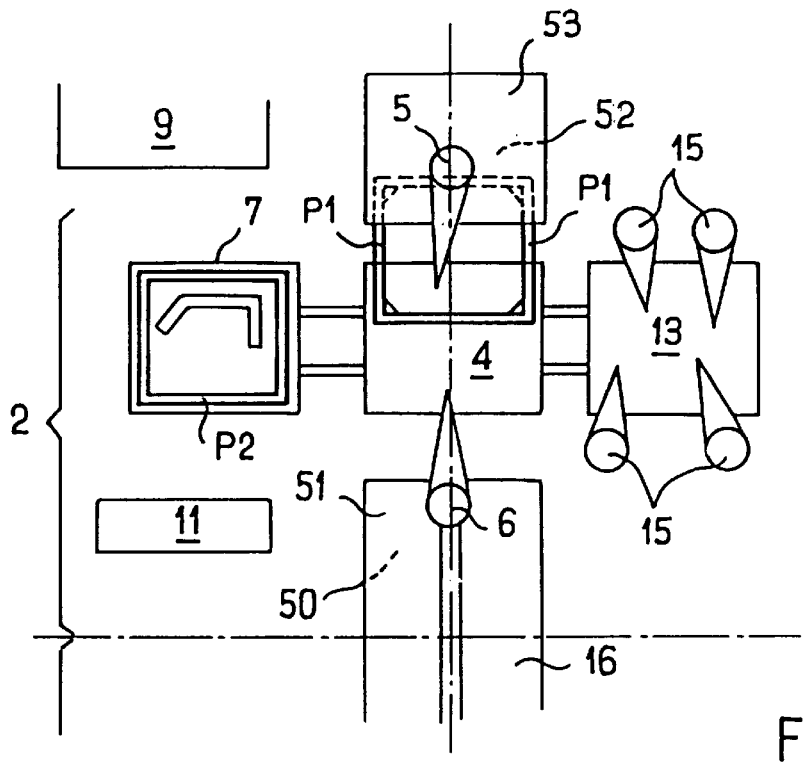
FIG_6
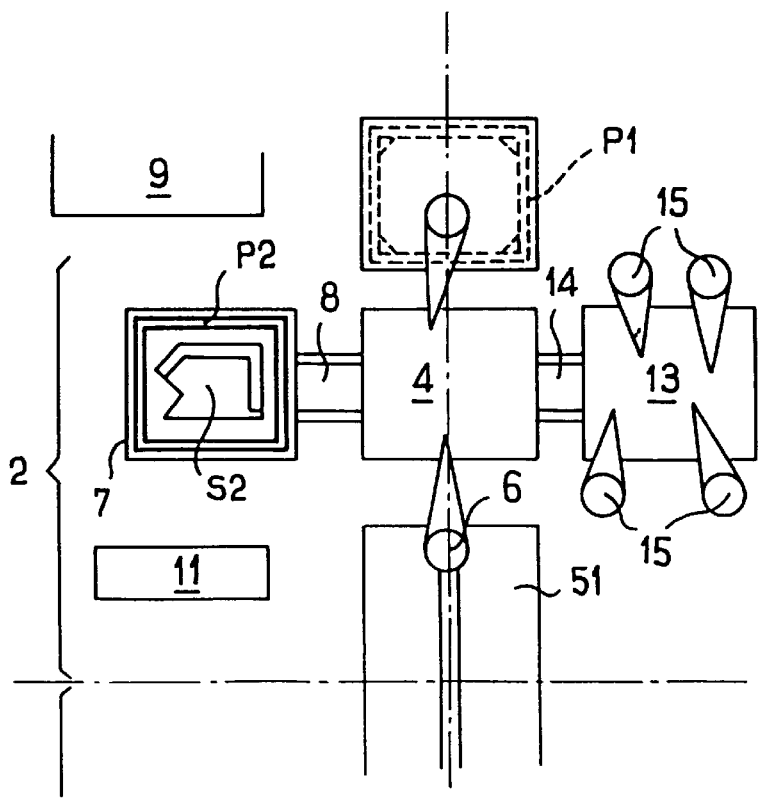
FIG_7

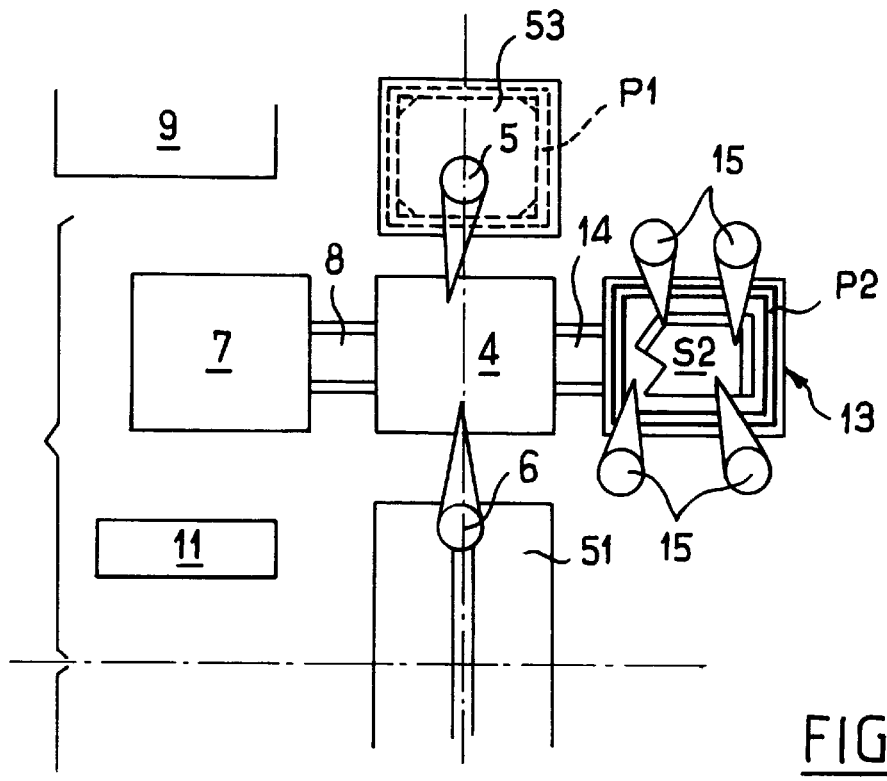
FIG_8
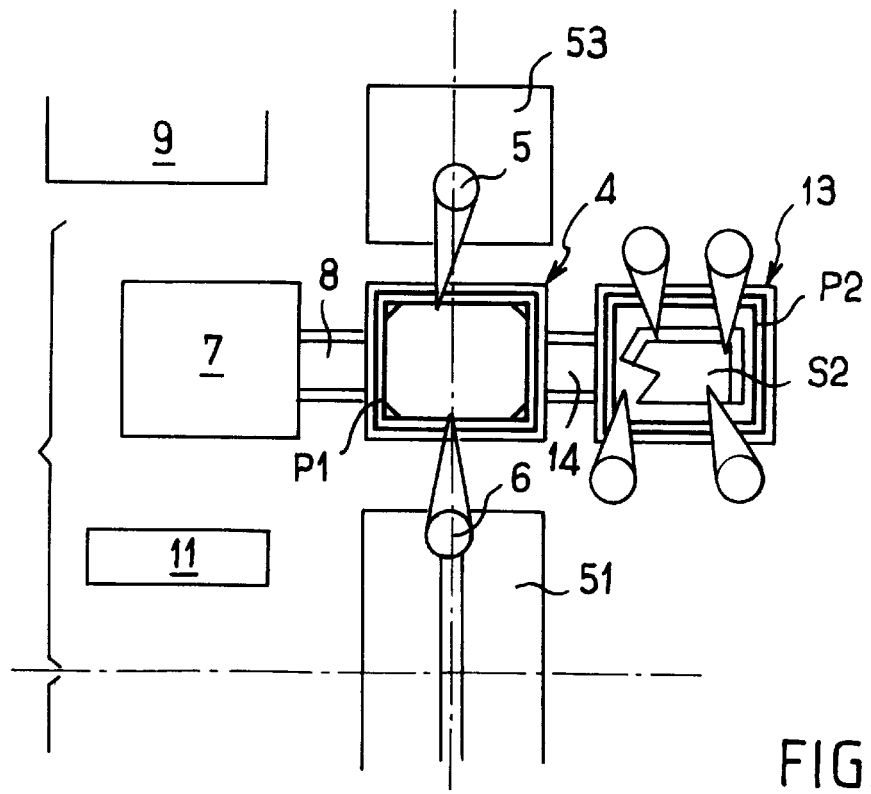
FIG_9

ASSEMBLY WORKSHOP, IN PARTICULAR FOR ASSEMBLING TOGETHER SHEET METAL PARTS

The present invention relates to a workshop for producing sheet metal assemblies. In such a workshop, elements held in determined and precise relative positions are assembled together in stages.

BACKGROUND OF THE INVENTION

In automobile body construction, a body subassembly is constructed using elements which are prepared by being disposed relative to one another in a sort of jig, the jig then being transported to and placed in a station in which the held-together elements are fixed together, in particular by spot welding. A subassembly is thus obtained which, if necessary, is transferred to a second preparation station so that other individual elements can be added. The new, supplemented assembly is then assembled precisely by spot welding.

This operation sequence can be repeated as many times as is necessary to obtain a completed assembly.

Usually, the stations for constructing such an assembly are disposed along a general direction defined by general conveyor means which serve each preparation station, assembly station, and finishing station. An assembly line is thus constituted in which the stations control one another. In such a line, since the stations are numerous and they are disposed in succession, they are ill-suited to making sheet metal assemblies that are different from one another. Furthermore, access to each of the stations of such a line is limited because the space available around each station is limited.

OBJECTS AND SUMMARY OF THE INVENTION

An object of the present invention is to remedy the drawbacks suffered by conventional workshops for assembling sheet metal assemblies, by providing a modular workshop organization in which all of the modules have a standard pattern, and each of them includes all of the functions required for preparing, assembling, and finishing off a respective subassembly, it being necessary merely to increase the number of modules as a function of the complexity and of the number of parts constituting the final assembly to satisfy almost all of the needs encountered in this type of industry.

To this end, the invention provides an assembly workshop in particular for assembling together sheet metal parts, the workshop including preparation stations for putting parts in place relative to one another, assembly stations for fixing the prepared parts together, and optionally finishing stations serving to finish off fixing the parts together. More precisely, said workshop is constituted by a plurality of modules, interconnected by at least one general conveyor means extending in a determined direction, each module including a loading and unloading central station through which the general conveyor means passes, a preparation lateral station connected to the central station by a conveyor substantially perpendicular to the conveyor means, an assembly station connected to the central station by a conveyor substantially perpendicular to the general conveyor means, and at least one finishing station situated along the general conveyor means, downstream from the central station.

One of the advantages of this type of structure lies in the fact that it is possible to rationalize the equipment and the tools to be implemented, since they can be standard regardless of the type of sheet metal assembly to be constructed.

Advantageously, provision may be made for the assembly stations of the modules making up the workshop to be situated on the same side of the general conveyor means. When the assembly workshop includes two sets of modules for constructing at least two different sheet metal assemblies, this enables the assembly station of each module in a set to be shared in common by the corresponding module of the other set.

Generally, the sheet metal parts to be assembled together to constitute subassemblies or assemblies are put in place in supports of the jig type which may take various forms. They may be pallets in which the parts to be assembled together are put in place, held, and transported from one station to another within the same module. They may also be more lightweight supports (referred to as "cassettes") which remain associated with the assembled parts throughout construction of the assembly. When pallets are used, only the parts travel from module to module, whereas, when cassettes are used, they travel with the parts from one module to another.

Thus, advantageously, the workshop of the invention may include means for handling the pallets to displace them between the loading and unloading station of each module and one or more storage zones situated in the vicinity of said station. Preferably, the handling means extend in the direction of the general conveyor means between the loading and unloading station and at least one pallet storage station. In a preferred embodiment, said storage station is situated under the general conveyor means and downstream from the loading and unloading station, and, if a finishing station is provided at that stage, said storage station is situated under said finishing station.

Other characteristics and advantages appear from the following description of an embodiment of the invention given by way of non-limiting example.

BRIEF DESCRIPTION OF THE DRAWINGS

Reference is made to the accompanying drawings, in which:

FIG. 1 is a diagram showing the basic module implemented in a workshop of the invention;

FIGS. 2, 3, 4, 5, 6, 7, 8, and to 9 show the various operating stages of the module of the invention.

MORE DETAILED DESCRIPTION

Figure 10:
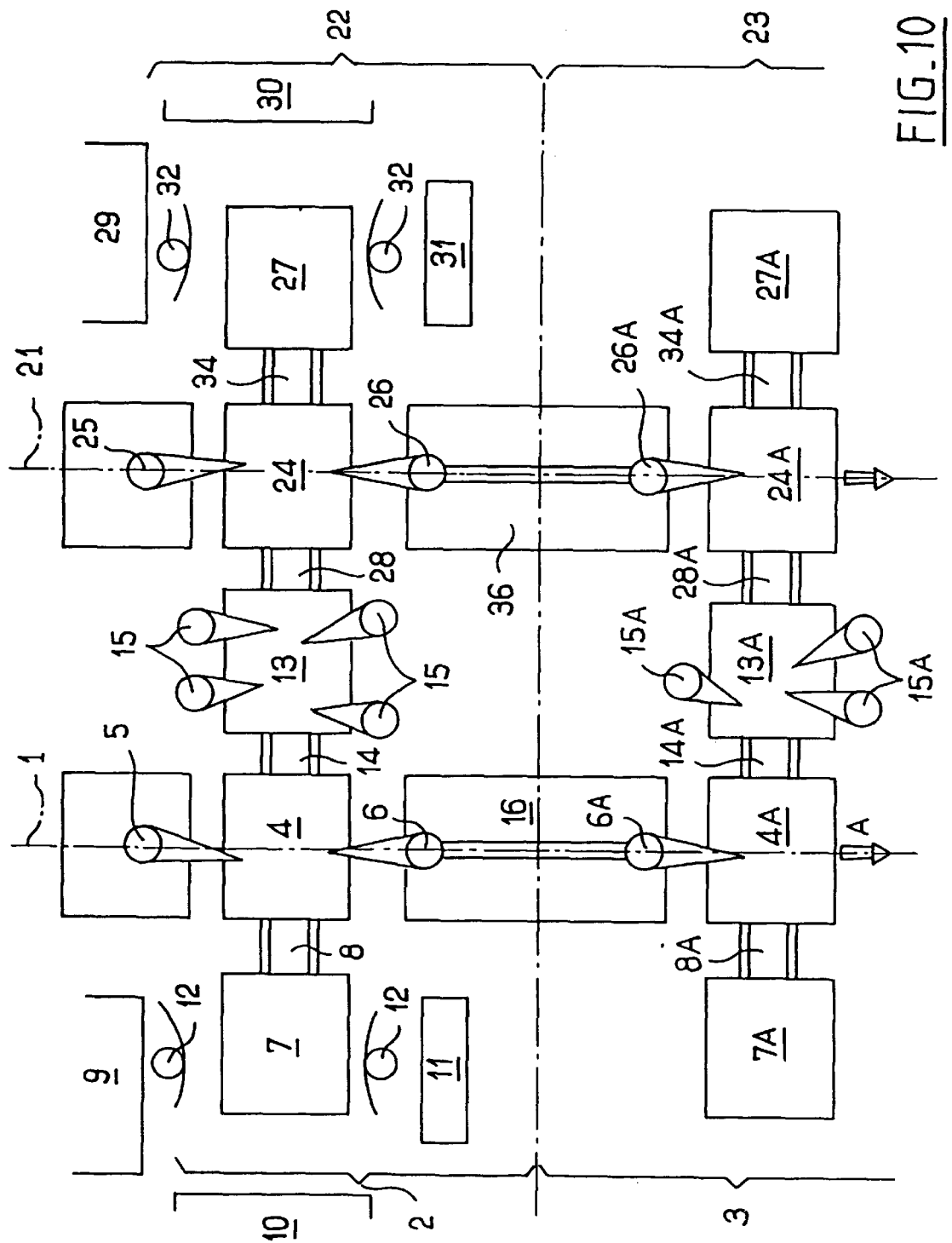
FIG. 10 is a diagram showing part of an assembly workshop comprising two lines for manufacturing two sheet metal assemblies that are similar but not identical.

In FIG. 1, reference 1 is used to designate general conveyor means whose direction, represented by arrow A, is determined and constitutes the general direction of the production flow. In accordance with the invention, the general conveyor 1 interconnects a plurality of modules 2, 3 by means of which the sheet metal assembly is progressively put together and assembled. A workshop is thus constituted by a plurality of modules such as 2 and 3 served by general conveyor means 1, in which workshop each module is organized in standard manner as described below with reference to the module 2.

The module 2 includes a central station 4 through which the general conveyor means 1 pass. The central station is provided with loading and unloading means 5 and 6 represented in this example by handling robots. The module 2 further includes a preparation lateral station 7 connected to the central station 4 by a conveyor 8 which extends in a direction that is substantially perpendicular to the direction A of the general conveyor 1. In this preparation station, the various parts or subassemblies that are to be fixed together are put in place after they have been taken from magazines 9 and 10 situated in the vicinity of the station 7 or from secondary preparation stations 11 also situated in the vicinity thereof. This preparation work is performed by "servants" 12 which may be either human operators or else handling and positioning machines, e.g. robots. The various parts may advantageously be grouped together in the form of a collection to reduce the time required to put them in place. In the station 7, the various elements to be fixed together are put in place by means of supports forming holding jigs for holding the elements in their determined relative positions.

The module 2 also includes an assembly station 13 which is connected to the central station 4 by a conveyor 14 that is substantially perpendicular to the direction A of the general conveyor means 1. This assembly station 13 is provided with welding robots 15, or with any other equivalent assembly means, which are programmed to fix together the parts prepared in the station 7.

Finally, the module 2 includes a station 16 which is served by the general conveyor means 1, which is situated downstream from the station 4, and which constitutes a finishing station, i.e. a station in which additional operations are performed such as spot welding, gluing, punching, inserting studs, etc. e.g. by means of a floor tool 17. The element processed in this station 16 is carried by the general conveyor means which is represented in this example by the robot 6 for unloading the station 4, which robot is itself mounted to move through the station 16 firstly for serving the clamp tool 17 and secondly for taking up its position 6A so as to constitute the loading means for loading a loading and unloading station 4A of the module 3 following the module 2 in the direction A of the general conveyor 1. Naturally, the handling means 6 may be assisted by placing means secured to the station 16, e.g. such as positioning abutments associated with the floor tool 17.

Assuming that the module 2 is the first module in the line, the loading robot 5 places a jig on the station 4, the jig being of the cassette type for mutually positioning a certain number of elements to be assembled together, i.e. a support that remains secured to the parts and travels with them from module to module. By means of the conveyor 8, the cassette is transferred to the station 7 where the operators 12 equip it with the parts and elements to be assembled together. The equipped cassette is then transferred to the station 13 by means of the conveyor 8 and of the conveyor 14, via the loading and unloading station 4. At the station 13, the robots 15 fix together the elements carried by the cassette. The station 13 is a "geometry" station, i.e. it includes elements for putting the cassette in place very accurately in the reference frame of the welding robots 15, and/or positioning means for positioning all or some of the elements carried by the cassette, which elements may be dissociated at least in part from the cassette at the station 13 so as to be processed directly by the geometry tools associated with the station 13. While this fixing is taking place, the station 4 is loaded, e.g. by the robot 5, with another cassette to be equipped.

Once the subassembly has been assembled in the station 13, it is transferred by the conveyor 14 to the station 4 at the same time as the cassette that was at the station 4 is transferred to the station 7 to be equipped therein. The robot 6 unloads the assembled subassembly from the station 4, and places it facing the welding clamp 17 for finishing off mutual fastening together of the parts of the subassembly assembled in the station 13.

In its position 6A, the robot 6 places the resulting subassembly (optionally with its cassette) in the central station 4A of the following module 3. When the subassembly is not associated with a cassette, it is placed on its own in the central station 4A of the module 3 which includes a jig for receiving it. In the module 3, the subassembly is supplemented with other elements at the station 7A and, in the same way as in the module 2, the new elements are assembled in the station 13A.

It should be noted that the general conveyor 1 may be constituted by a succession of mutually different conveyor means such as robots, floor conveyor means, overhead conveyor means, etc. The diagram in FIG. 1 clearly shows up one of the main advantages of the internal organization of a module, namely that the preparation station 7 is accessible via three of its sides and is in a zone that is free of any rotating mechanisms such as robots or other conveyors that might pose safety problems for operators in said zone. The space available for access to the station 7 can thus be used advantageously for constituting magazines for feeding parts to the station 7, and for installing handling means. The magazines 9, 10 and the secondary preparation stations such as the station 11 are also easily accessible for restocking purposes.

FIGS. 2 to 9 show how a module of the invention operates when the elements to be assembled together are grouped together on a jig in the form of a pallet and not a cassette, i.e. a jig that does not travel from module to module with the parts. The above-described elements bear the same references.

These figures show how two different subassemblies S1 and S2 using two different pallets P1 and P2 can be assembled in the same module. Naturally, the following description also applies to identical subassemblies and identical pallets. FIG. 2 shows the stage during which the subassembly S1 is being assembled in the station 13 while the pallet P2 is being transferred to the central station 4 from a storage station 50, in this example situated under a platform 51 for supporting the robot 6.

As shown in FIG. 4, once the assembly S1 has been assembled, the pallet P1 is transferred from the station 13 to the station 4, and the pallet P2 is simultaneously transferred from the station 4 to the station 7.

In FIG. 5, the pallet P2 is equipped with the constituent elements of the subassembly S2 while the assembly S1 is removed from the pallet P1 by means of the robot 6 which conveys it to the following module 3.

By means, for example, of the robot 5 (or of any other suitable conveyor means), the empty pallet P1 is transferred from the station 4 to a storage station 52, in this example situated under the platform 53 of the support of the robot 5. At the same time, the operators continue to equip the pallet P2 in the station 7.

FIG. 7 shows the end of this operating stage.

Once the preparation of the pallet P2 is complete, said pallet is transferred to the station 13 for the purposes of performing the welding operations necessary for assembling together the parts. FIG. 8 shows this stage. During welding, as shown in FIG. 9, the pallet P1 is transferred to the station 4 to be ready to go to the station 7 when the assembly S2 together with the pallet P2 arrive at the station 4.

The pallet P2 is then separated from the assembly S2 and stored in the station 50. Finally the pallet P1 is transferred from the station 7 to the station 13, and the cycle starts again as shown in FIG. 2.

The operating sequence may be simplified if subassemblies of a single type are to be repetitively assembled using one pallet only. The pallet then merely goes from the station 7 to the station 13, and then from the station 13 to the station 7 with the pallet stopping at the station 4 to be unloaded.

Another major advantage of the modular workshop of the invention, and in particular of the architecture of each module, as described above, appears in FIG. 10.

FIG. 10 shows successive modules 2, 3 as described above and with the same references along first general conveyor means 1. Parallel to the general assembly line 1, the workshop shown in FIG. 10 includes a second assembly line 21 formed, like the line 1, of successive modules 22, 23, each of which has a central station 24, 24A, a preparation station 27, 27A, and a finishing station 36, 36A. It can be observed that the assembly station 13 of the module 2 also constitutes the assembly station of the module 22. It is thus possible to present the assembly station 13 either with parts and subassemblies prepared in the station 7, or with parts or subassemblies prepared in the station 27. In the station 13, only the programming of the robots 15 differs depending on whether the parts to be welded come from the station 7 or from the station 27. The appropriate programming can be selected instantaneously. The station 13 lends itself to processing either of the subassemblies equally well, and, as a result, the occupancy time of the station 13 is optimized, which is a considerable economic advantage when installing and operating a workshop of the invention because the assembly stations 13, 13A represent the largest investment given the particularly strict geometrical constraints that must be satisfied in such stations.

Naturally, the modules 22 and 23 are provided with the same elements as those described with reference to the modules 2 and 3, using the same references as are used for the modules 2 and 3 plus twenty.

What applies for two lines 1 and 21 of modules serving to assemble different assemblies applies even more so if, for reasons of capacity, identical assemblies are to be manufactured on two parallel lines having common assembly stations 13 shared by corresponding modules.

It should be noted that the loading and unloading means 5, 6; 25, 26 are used both to transfer the subassemblies from one module to another along their assembly line, and also to remove the jigs required to hold the subassemblies from the stations 4, 24.

Without going beyond the ambit of the invention, handling means may be provided for the jigs P1, P2 other than the means 5, 6, 25, 26 shown (floor chain, moving tables, etc.).

The invention may be applied particularly advantageously to the field of automobile construction, and in particular in assembly lines for assembling automobile body subassemblies such as body sides. It also makes variant embodiments possible in which, for example, the subassemblies can be removed from the line via the stations 7.

Finally, when there are two pallets, provision may be made to store a full pallet instead of an empty pallet at one of the stations 50 or 52. The pallet is then sent directly to the station 13 for assembly purposes, and then via the station 4 for unloading purposes, to the station 7 where it is equipped again before it is stored full. One pallet is removed from the store while the other pallet is being equipped, and the pallet removed from the store is transferred to the station 13 at the same time as the equipped pallet is being transferred from the station 7 to the station 4.

We claim:

1. An assembly workshop for assembling together sheet metal parts, the workshop including at least a general conveyor means, preparation stations for putting said parts in place relative to one another, and assembly stations for fixing together said parts as they are put in place, wherein said workshop comprises a plurality of modules, interconnected by said general conveyor means extending in a determined direction, each module including a loading and unloading central station through which said general conveyor means passes, a preparation lateral station connected to the central station by a conveyor substantially perpendicular to said general conveyor means, and an assembly station connected to the central station by a conveyor substantially perpendicular to said general conveyor means.

2. A workshop according to claim 1, wherein each module includes at least one storage station for storing a support for supporting the parts processed in the module, and handling means for displacing the support between the storage station and said loading and unloading central station.

3. A workshop according to claim 1, wherein at least one of the modules also includes at least one finishing station situated along said general conveyor means, downstream from said central station.

4. A workshop according to claim 2, wherein at least one of the modules also includes at least one finishing station situated along said general conveyor means, downstream from said central station, and wherein said storage station is situated under said finishing station.

5. An assembly workshop according to claim 1, wherein the assembly station of each of the modules making up the workshop is situated on the same side of said general conveyor means.

6. An assembly workshop according to claim 5, comprising two sets of modules for assembling at least two sheet metal assemblies, wherein the assembly station of each model of a set is shared in common by the corresponding module of the other set.

* * * * *